United States Patent
Tochihara et al.

[11] Patent Number: 5,993,527
[45] Date of Patent: *Nov. 30, 1999

[54] INK-JET COLOR RECORDING PROCESS AND INK SET THEREFOR

[75] Inventors: Shinichi Tochihara, Hadano; Masami Ikeda, Yokohama; Tadayoshi Inamoto, Hachioji; Kiyomi Aono, Kawasaki; Hiromichi Noguchi, Hachioji, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/557,825

[22] Filed: Nov. 14, 1995

[30] Foreign Application Priority Data

Nov. 17, 1994 [JP] Japan .................................. 6-307137

[51] Int. Cl.⁶ .................................................. C09D 11/02
[52] U.S. Cl. ................................. 106/31.85; 106/31.75; 106/31.78; 106/31.86; 106/31.89; 106/31.9
[58] Field of Search .......................... 106/31.85, 31.86, 106/31.87, 31.89, 31.75, 31.76, 31.6, 31.64, 31.9, 31.78

[56] References Cited

U.S. PATENT DOCUMENTS

| | | | |
|---|---|---|---|
| 4,077,930 | 3/1978 | Lim et al. | 524/801 |
| 4,484,952 | 11/1984 | Bes et al. | 106/504 |
| 4,959,661 | 9/1990 | Buxton et al. | 347/100 |
| 5,085,698 | 2/1992 | Ma et al. | 524/388 |
| 5,151,218 | 9/1992 | Haubennestel et al. | 106/493 |
| 5,518,534 | 5/1996 | Pearlstine et al. | 106/31.75 |
| 5,531,816 | 7/1996 | Wickramanayake | 106/31.78 |
| 5,541,031 | 7/1996 | Yamashita et al. | 430/109 |
| 5,549,740 | 8/1996 | Takahashi et al. | 106/31.43 |
| 5,555,008 | 9/1996 | Stoffel et al. | 347/100 |
| 5,618,338 | 4/1997 | Kurabayashi et al. | 106/31.37 |
| 5,679,141 | 10/1997 | McInerney et al. | 106/31.6 |
| 5,738,716 | 4/1998 | Santilli et al. | 106/31.77 |
| 5,846,306 | 12/1998 | Kubota et al. | 106/31.75 |

FOREIGN PATENT DOCUMENTS

| | | |
|---|---|---|
| 0588316 | 3/1994 | European Pat. Off. . |
| 4170474 | 6/1992 | Japan . |
| 5155006 | 6/1993 | Japan . |
| 6001936 | 1/1994 | Japan . |

*Primary Examiner*—Helene Klemanski
*Attorney, Agent, or Firm*—Fitzpatrick, Cella, Harper & Scinto

[57] ABSTRACT

Provided is an ink-jet color recording process to form color images on a recording medium by an ink-jet system applying a plurality of colored pigment-based inks, wherein each of the colored pigment inks comprises a pigment dispersant, and a pigment dispersant contained in at least one of colored pigment-based inks is different from a pigment dispersant contained in the remaining colored pigment-based inks.

20 Claims, 4 Drawing Sheets

INK-JET COLOR RECORDING PROCESS AND INK SET THEREFOR

BACKGROUND OF THE INVENTION

1. Field of the Invention

This invention relates to an ink-jet color recording process in which a plurality of colored pigment-based inks are used, and further to an ink set suitable for use in such process.

2. Related Background Art

In recent years, ink-jet recording systems have made rapid progress for office use as well as for personal use because they are less noisy, economical of running cost, easy to be colorable and feasible with downsized apparatus.

A keen demand has lately been voiced for ink-jet recording devices that are inexpensive in particular and capable of producing color images. In order to cope with this trend, it has been proposed to mount on such a type of device a plurality of recording heads each designed to provide the same ejection characteristics and also a plurality of recording liquids formulated with water-soluble dyes, thereby obtaining a color image. In case of color images, however, if a plurality of colors involves even one having insufficient fastnesses to water and to light, the whole color image often poses an extreme decline in quality. To eliminate this problem, it is desired that pigments which have a good fastness be employed as colorants for ink-jet recording liquids. There have been found various patent publications to that effect.

Almost all of the above publications are directed toward an improvement in preventing an occurrence of agglomeration, precipitation and separation of a pigment during storage of the resulting ink, or in avoiding a nozzle clogging due to the use of pigments. This means that less is elucidated as to the ejection characteristics of pigment-based inks relative to the associated recording heads. These characteristics here are typified by ejection quantity, ejection speed and frequency response and taken as essentially basic and most important ink-jet recording.

With respect to ink-jet color recording in particular, a limited coverage of technological findings is available at present. For instance, Japanese Patent Application Laid-Open No. 4-170474 proposes to improve an ejection stability, i.e., a durability of printing operation. To provide a color image of high quality, the first key resides in satisfying a given set of ejection characteristics, followed by retention of the ejection characteristics. With conventional dye-based inks, the ejection characteristics are easy to meet at an initial stage. On the contrary, in case of pigment-based inks, these characteristics vary largely with the kind of dispersing media used for pigments. This variation is in most cases dominated by a frequency response. In case of dye-based inks, a similar problem can be solved by the addition of various solvents and other additives since a dye is more stable in a liquid medium than a pigment, and hence, only modified formulations of the dye-based inks are sufficient to clear up that problem.

A pigment, however, is known to be poor in stability, namely dispersion stability, in a liquid medium as compared to a dye. Therefore, a pigment-based ink has a smaller amount of leeway in selecting solvents and additives than a dye-based ink and necessarily relies upon optimum ejection characteristics. In such instance, a single recording head may be optimized from the ejection viewpoint for ink-jet monochrome recording, whereas at least a few recording heads are required to be individually optimumly designed for ink-jet color recording.

SUMMARY OF THE INVENTION

With the foregoing problems of the prior art in view, an object of the present invention is to provide an ink set which can make ejection characteristics stable of recording heads for pigment-based inks in various colors and is better for a storage stability.

Another object of the present invention is to provide an ink-jet color recording process which allows a plurality of recording heads to eject a plurality of pigment-based inks of varying colors in an averaged or balanced manner.

The above and other objects, advantages and features of the present invention will be apparent from the following description taken in conjunction with the accompanying drawings.

The above objects can be achieved by the present invention.

According to the present invention, there is provided an ink-jet color recording process to form color images on a recording medium by an ink-jet system applying a plurality of colored pigment-based inks, wherein each of said colored pigment inks comprises a pigment dispersant, and a pigment dispersant contained in at least one of colored pigment-based inks is different from a pigment dispersant contained in the remaining colored pigment-based inks.

According to the present invention, there is also provided an ink set comprising a plurality of colored pigment-based inks, wherein each of said colored pigment inks comprises a pigment dispersant, and a pigment dispersant contained in at least one of colored pigment-based inks is different from a pigment dispersant contained in the remaining colored pigment-based inks.

DESCRIPTION OF THE PREFERRED EMBODIMENTS

Figure 1:
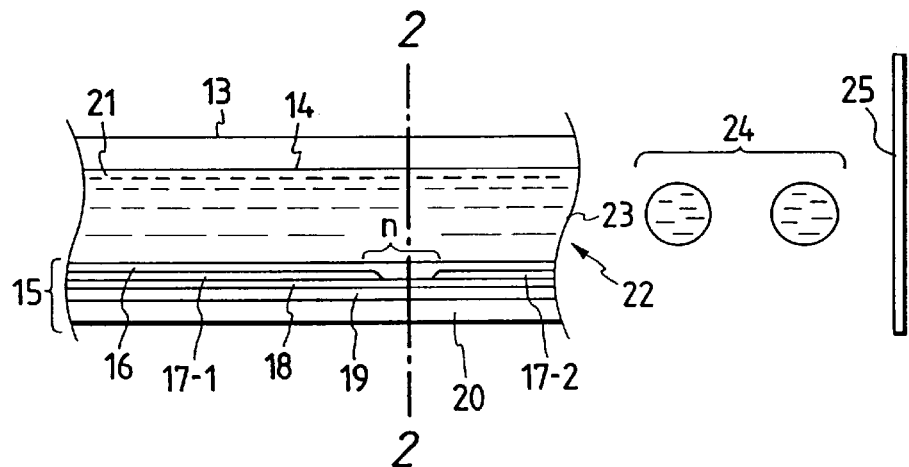
FIG. 1 is a longitudinal cross-sectional view of a head portion of the ink-jet recording apparatus used in the present invention.

The present invention will now be described in great detail.

Pigment dispersants eligible for the present invention are water-soluble surfactants and water-soluble resins in common use. Their choice depends upon the kind of pigments used. As stated hereinbefore, the present invention contemplates attaining balanced ejection characteristics without a pigment dispersion destructed. Of particular importance is that in the practice of the present invention, an optimum pigment dispersion should be used by selecting a suitable pigment with close attention paid to the ejection characteristics and further by directing close attention to the dispersion stabilizability of the pigment.

Uniform ejection characteristics are difficult to gain with one identical dispersant added to a plurality of inks comprising each at least different pigment species as concerns recording heads of a bubble-jet controlling system in which ink droplets are ejected by the action of thermal energy. As a result of their continued research, the present inventors have found that the ejection characteristics can be controlled by the use of a different type dispersant in either one of a plurality of colored pigment-based inks and that surfactants are effective particularly for organic pigments.

Namely, an important point for obtaining a good ejection stability to a recording head of an ink-jet controlling system is to adjust a viscosity of an ink within a desired range.

Generally, ejection characteristics tend to be lowered as an ink viscosity is increased, and in particular, a frequency response is easily influenced thereby. This frequency response is an important factor in controlling a recording speed of an ink-jet recording apparatus, the importance of which is increased recently from the viewpoint of speed-up of not only a monochrome recording, but also a color recording.

However, in case of a resin dispersion using a water-soluble resin, the ink viscosity cannot be decreased by using a smaller amount, since the resin itself is of a high molecular weight. Furthermore, a dispersion stability of a pigment should be ensured under such conditions. In other words, it is a point whether the dispersion stability of a pigment can be satisfied, or not, with a resin amount as little as possible and capable of decreasing an ink viscosity within a desired range, which depends greatly on a kind of pigments. That is to say, in case of carbon blacks, the above problems have been able to be solved by using a water-soluble resin having a weight average molecular weight within a specified range, while, in a case of an organic pigment, the above problems have not been able to be solved, in particular in cases of magenta and cyan, of these in cases of quinacridon-type and phthalocyanine-type pigments having a good hue.

Now, a water-soluble surfactant is used as a pigment dispersant in place of a water-soluble resin. As a result, a colored pigment-base ink that has a sufficient dispersion stability and good ejection characteristics can be obtained, since an ink viscosity is less increased as compared with a water-soluble resin, even if the same amount is used.

Suitable water-soluble surfactants may be of an anionic, cationic, amphoteric or nonionic class.

Anionic surfactants used herein include higher fatty acid salts, alkyl sulfate salts, alkylether sulfate salts, alkyester sulfate salts, alkylarylether sulfate salts, alkyl sulfonate salts, sulfosuccinate salts, alkylallyl sulfonate salts, alkyl-naphthalene sulfonate salts, alkyl phosphate salts, polyoxyethylene alkylether phosphate salts, alkylarylether phosphate salts and the like.

Cationic surfactants used herein include alkylamine salts, dialkylamine salts, tetraalkyl ammonium salts, benzalkonium salts, alkylpyridinium salts, imidazolinium salts and the like.

Amphoteric surfactants used herein include dimethylalkyl lauryl betaines, alkyl glycine, alkyl-di(aminoethyl)glycine, imidazolinium betaines and the like.

Nonionic surfactants used herein include polyoxyethylene alkylethers, polyoxyethylene alkylallyethers, polyoxyethylene-polyoxypropylene glycols, glycerin esters, sorbitan esters, saccharide esters, polyoxyethylene ethers of glycerol esters, polyoxyethylene ethers of sorbitan esters, polyoxyethylene ethers of sorbitol esters, fatty acid alkanolamides, polyoxyethylene fatty acid amides, amine oxides, polyoxyethylene alkylamines and the like.

In particular, quinacridone and phthalocyanine pigments can lead a good result in cases of using phosphate ester-type surfactants, polyoxyethylene fatty acid amides and polyoxyethylene alkyl amines as a pigment dispersant.

Suitable water-soluble resins can be chosen from block copolymers, random copolymers and salts thereof obtained from two or more monomers selected from the group consisting of styrene, styrene derivatives, vinyl naphthalene derivatives, fatty acid alcohol esters of $\alpha,\beta$-ethylenically unsaturated carboxylic acids, acrylic acid, acrylic acid derivatives, maleic acid, maleic acid derivatives, itaconic acid, itaconic acid derivatives, fumaric acid, fumaric acid derivatives and the like. Such resins are particularly preferred since they are alkali-soluble in an aqueous solution having a base dissolved therein and, when used as ink-jet inks, are capable of reducing the viscosity of a dispersion and are readily dispersible.

In addition, there may be used homopolymers derived from hydrophilic monomers and salts thereof, water-soluble resins such as polyvinyl pyrrolidone, polyvinyl alcohol, carboxymethyl cellulose, condensates of naphthalene sulfonic acid with formaldehyde and the like, and naturally occurring resins such as rosin, shellac and the like. These water-soluble resins have a weight average molecular weight of from 500 to 30,000, preferably from 100 to 15,000.

The amount of each of the water-soluble surfactant and water-soluble resin to be used is in the range of from 0.1 to 10% by weight, preferably from 1 to 5% by weight, based on the total weight of the ink.

A pigment for use in the ink of the present invention may be contained in an amount of from 1 to 20% by weight, preferably from 2 to 12% by weight, based on the total weight of the ink.

To implement the present invention, any pigments can be utilized as far as they meet with the performance qualities noted above. Carbon blacks used in a black ink are those derived by the furnace method or by the channel method and having a primary particle size of from 15 to 40 nm, a specific area of from 50 to 300 $m^2/g$ by the BET method, a DBP adsorption of from 2 of 40 to 150 ml/100 g, a volatile content of from 0.5 to 10% and a pH of from 2 to 9. The carbon blacks include for example No. 2300, No. 900, MCF 88, No. 33, No. 40, No. 45, No. 52, MA 7, MA 8, No. 2200B (all tradename, produced by Mitsubishi Chemical Co.), RAVEN 1255 (tradename, produced by Colombia Co.), REGAL 400R, REGAL 330R, REGAL 660R, MOGULL (all tradename, produced by Cabot Co.), Color Black FW1, Color Black FW18, Color Black S170, Color Black S150, Printex 35 and Printex U (all tradename, produced by Degussa Co.), all of which are commercially available. Also included among them are carbon blacks tailored for the present invention.

Pigments used in a yellow ink include for example C.I. Pigment Yellow 1, C.I. Pigment Yellow 2, C.I. Pigment Yellow 3, C.I. Pigment Yellow 13, C.I. Pigment Yellow 16, C.I. Pigment Yellow 74, C.I. Pigment Yellow 83, C.I. Pigment Yellow 109 and C.I. Pigment Yellow 110.

Pigments used in a magenta ink include for example C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 112, C.I. Pigment Red 122, C.I. Pigment Red 202 and C.I. Pigment Red 207.

Pigments used in a cyan ink include for example C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6. Also included among them pigments tailored for the present invention.

When it is found desirable, surface treatment may be made to the above pigments to improve their wettability.

From the viewpoint of hue, quinacridone pigments such as C.I. Pigment Red 122, C.I. Pigment Red 202 and C.I. Pigment Red 207 are preferable for a magenta color, and phthalocyanine pigments such as C.I. Pigment Blue 15:3 and the like are preferable for a cyan color.

Aqueous media suitable for the ink of the present invention are water and a mixture of water with a water-soluble organic solvent. Water used here is ion-exchanged water (deionized water), but not water containing various ions for general use. The content of water in the ink is in the range of from 20 to 80% by weight, preferably from 30 to 60% by weight.

Water-soluble organic solvents that may be optionally mixed with water can be selected, for example, from alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol and the like, amides such as dimethylformamide, dimethylacetoamide and the like, ketones or ketone alcohols such as acetone, diacetone alcohol and the like, ethers such as tetrahydrofuran, dioxane and the like, polyalkylene glycols such as polyethylene glycol, polypropylene glycol and the like, alkylene glycols whose alkylene group has 2 to 6 carbon atoms such as ethylene glycol, propylene glycol, butylene glycol, hexylene glycol, diethylene glycol and the like, 1,2,6-hexane triol, thiodiglycol, glycerol, lower alkyl ethers of polyhydric alcohols such as ethylene glycol monomethyl (or monoethyl) ether, diethylene glycol monomethyl (or monoethyl) ether, triethylene glycol monomethyl (or monoethyl) ether and the like, N-methyl-2-pyrrolidone, 1,3-dimethyl-2-imidazolidinone and the like. Particularly preferred amongst them are a polyhydric alcohol such as diethylene glycol and a lower alkyl ether of a polyhydric alcohol such as triethylene glycol monomethyl (or monoethyl) ether.

To ensure stabilized ejection, it is preferred to add ethyl alcohol or isopropyl alcohol, or a lower alkyl ether of a polyhydric alcohol. Such a solvent facilitates stable foaming of a recording liquid or ink on a thin-layered resistor.

An amount of the water-soluble organic solvent to be added is within a range of from 5 to 60% by weight, preferably from 10 to 50% by weight, based on the total weight of the ink.

The ink of the present invention may contain, where desired, surfactants, defoaming agents, antiseptics and the like in addition to the above exemplified counterparts so that it offers further suitable physical properties. Urea, thiourea, ethylene urea or derivatives thereof may also be added to prevent drying nozzles.

Where a surfactant or resin of an alkali-soluble type is used, bases added to the dispersion may be preferably selected, for example, from the group consisting of ammonia, organic amines such as monoethanolamine, diethanolamine, triethanolamine, aminomethylpropanol, and the like, and inorganic bases such as potassium hydroxide, sodium hydroxide and the like.

Pigment dispersions according to the present invention can be prepared with the use of any suitable known mills exemplified by a ball mill, a roll mill, a sand mill and the like. Particularly preferred is a sand mill of a high-speed type, examples of which include those made available under the tradenames of Super Mill, Sand Grinder, Beads Mill, Agitator Mill, Grain Mill, Dyno Mill, Pearl Mill and Cobol Mill.

Pigments of a desired particle size distribution can be obtained by downsizing the milling media of a mill used, by increasing the filling ratio of the milling media, by prolonging a period of time required for treatment, by reducing the speed of ejection, or by classifying the pigment on a filter or centrifuge after milling. These modes of preparation may be conducted in combination.

The ink-jet color recording process of the present invention is practiced by the use of at least four different inks formulated with pigments of varied colors, a pigment dispersant contained in at least one of the inks being different from the pigment dispersants contained in the remaining inks, so that a color image is produced on a recording medium. To this end, it is preferred to apply thermal energy corresponding to recording signals to an ink in each of at least four recording heads, thereby generating ink droplets by that thermal energy.

A preferred form of apparatus for use in carrying out the recording process of the present invention is described hereunder.

Figure 2:
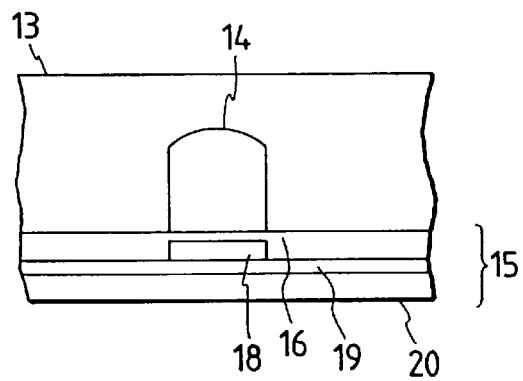
FIG. 2 is a transverse cross-sectional view of the head of FIG. 1 taken along the line 2—2.
Figure 3:
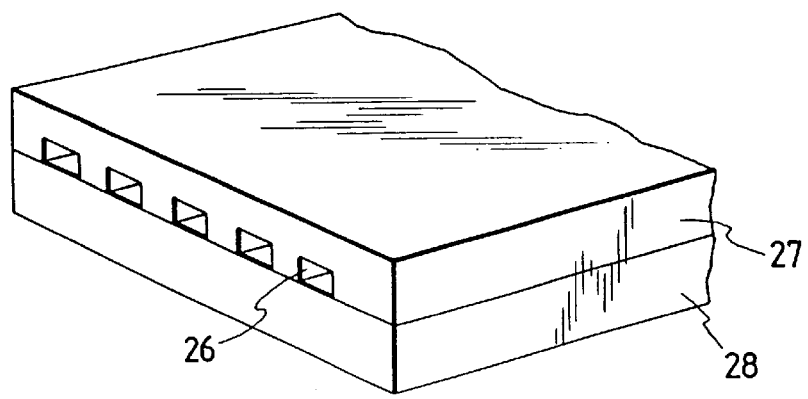
FIG. 3 is a perspective view showing a multi-nozzle head having a nozzle of the head of FIG. 1 assembled in succession.

A recording head, a main component of the apparatus, is illustrated in FIGS. 1, 2 and 3.

A nozzle of a head 13 is assembled by bonding a glass, ceramic or plastic plate onto a heating base 15 which can be used for thermal recording (the heating base shown in FIGS. 1 and 2 is illustrative, but not restrictive). The plate has a groove 14 for the passage of an ink. The heating base 15 is composed of a protective film 16 made of for example silicon oxide, aluminum electrodes 17-1 and 17-2, a heating resistor layer 18 made of for example nichrome, a heating accumulating layer 19 and a substrate 20 of good heat radiation made of alumina or the like. An ink 21 comes up to an ejection orifice 22 and forms a meniscus 23 due to a pressure P.

Now, upon application of electric signals to the electrodes 17-1 and 17-2, the heating base 15 rapidly generates heat at its region designated at n and forms bubbles in the ink 21 located in contact with that region. The meniscus 23 of the ink 21 is projected by the action of the pressure so produced, and the ink 21 is ejected in the form of recording droplets 24 from the orifice 22 to a recording medium 25. FIG. 3 schematically shows a multi-nozzle head having the head nozzle of FIG. 1 arranged in succession. The multi-nozzle head is formed by bringing a glass plate 27 into intimately adhesive contact with a heating base 28 similar to that of FIG. 1. The glass plate 27 is provided with a multiplicity of channels 26.

FIG. 1 shows the head 13 cross-sectionally viewed along the flow path of the ink, and FIG. 2 is a cross-sectional view of the head 13 taken along the line 2—2.

Figure 4:
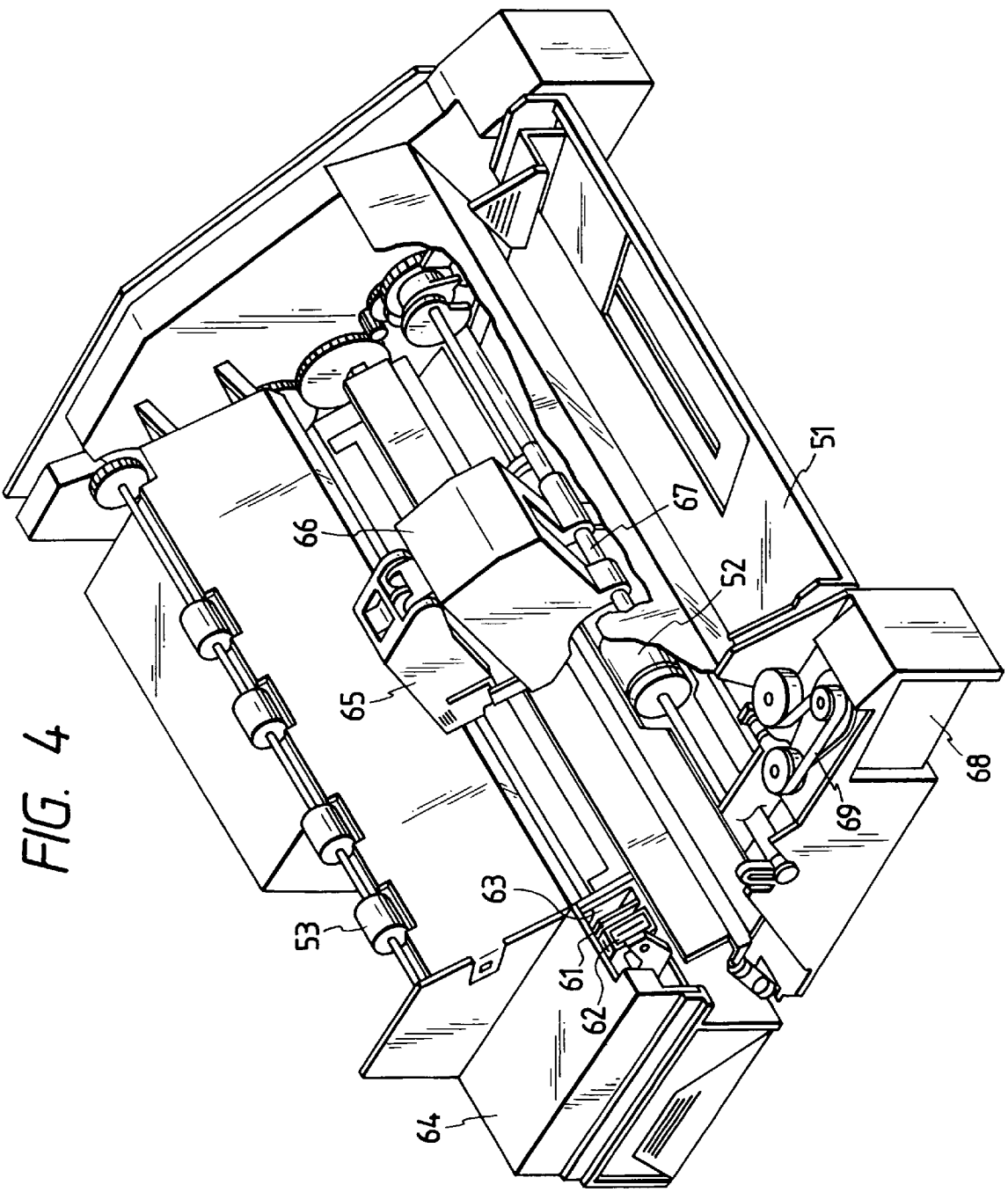
FIG. 4 is a perspective view illustrative of an ink-jet recording apparatus used in the present invention.

FIG. 4 illustrates an ink-jet recording apparatus in which the head 13 is assembled.

Referring to FIG. 4, reference numeral 61 denotes a blade serving as a wiping member, one end of which is fixed stationarily by a blade holder and thus acts like a cantilever. The blade 61 is disposed at a position adjacent to a region in which to operate the recording head and held such that it protrudes into a path through which the recording head travels. A cap 62 is located at a home position adjacent to the blade 61 and moves in a direction perpendicular to the position in which the recording head travels, thus coming into contact with the face of ink ejecting openings to cover the latter. An absorbing member 63 is placed in proximity to the blade 61 and held, like the blade 61, such that it protrudes into the path of the recording head. The blade 61, cap 62 and absorbing member 63 constitute an ejection-recovering portion 64 where the blade 61 and absorbing member 63 remove water, dust or other foreign matter from the face of the ink-ejecting openings.

Reference numeral 65 is a recording head having means for generating ejection energy and acting to eject the ink onto the recording medium placed in opposed relation to the ink-ejecting opening face, thereby effecting recording. A carriage 66 has the head 65 movably mounted thereon and is slidably engageable with a guide rod 67 and connected (not shown) at a portion thereof to a belt 69 driven by a motor 68. Thus, the carriage 66 moves along the guide rod 67 so that the head 65 can travel from a recording region to a region adjacent thereto.

A feeding part 51 is disposed to insert the record receiving material, and a feed roller 52 is driven by a motor (not shown). The record-receiving material is fed to a position opposite to the ink-ejecting opening face of the head 65 and, upon advancement of recording, discharged from a discharge section provided with discharge rollers 53.

The cap 62 in the ejection-recovering portion 64 detracts from the travel of the head 65 when the latter returns to its home position as after completion of the recording, while the blade 61 remains protruded in the travel path of the head 65. Thus, the ink-ejecting opening face of the head 65 is wiped. When the cap 62 comes into contact with the ink-ejecting opening face to cap the latter, it moves to protrude into the travel path of the head 65.

When the head 65 travels from its home position to a position in which to start recording, the cap 62 and blade 61 lie at the same location that wiping is done as stated above. While the head 65 is being moved, the ink-ejecting opening face is also wiped.

The head 65 travels to its home position not only when recording is completed, or when the head is recovered from ejection, but also when the head is moved for recording between recording regions, during which the head is moved at a given interval to the home position adjacent to each such region. This travel of the head 65 permits wiping of the ink-ejecting opening face.

Figure 5:
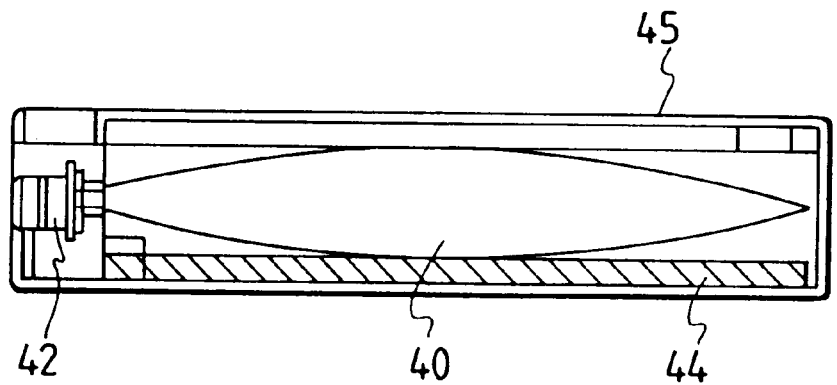
FIG. 5 is a longitudinal cross-sectional view of an ink cartridge used in the present invention.

Turning next to FIG. 5, an ink cartridge 45 is illustrated in which an ink is accommodated. The ink is put into the recording head 65 from the cartridge 45 via feed means such as a tube or the like. Designated at 40 is an ink pool such as for example an ink bag provided at its top end with a rubber plug 42. Insertion of a needle (not shown) into the plug 42 allows the ink in the bag 40 to flow into the recording head. An ink absorber 44 is disposed to absorb waste ink. The ink pool is formed of a polyolefin, polyethylene in particular, at its inner periphery for direct contact with the ink.

Figure 6:
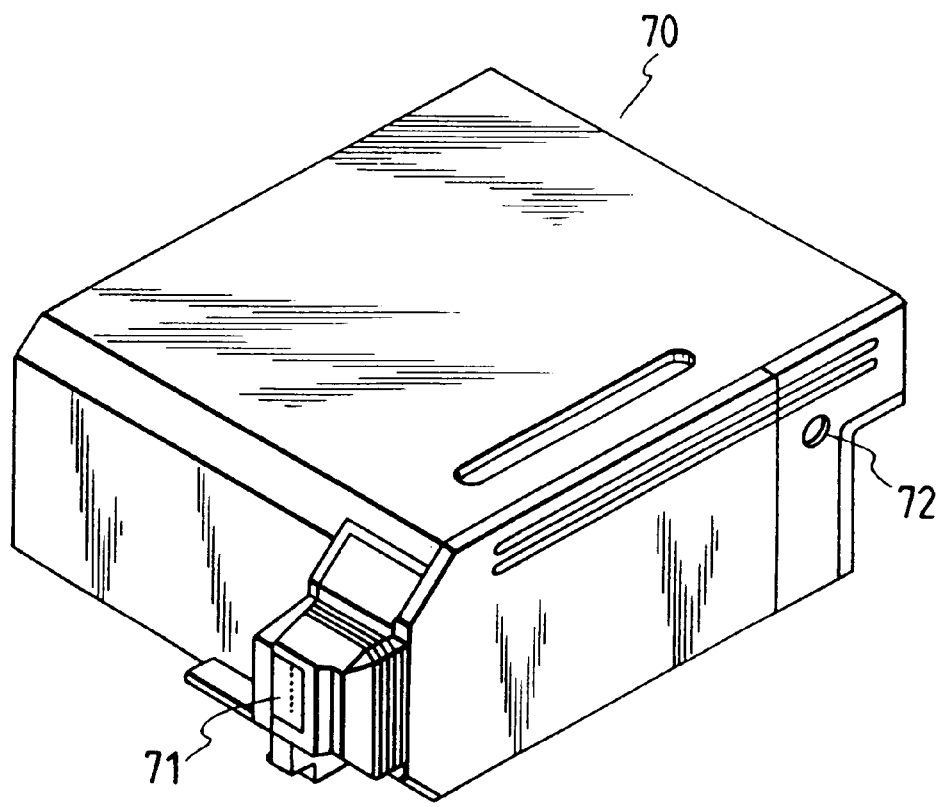
FIG. 6 is a perspective view of a recording unit used in the present invention.

The ink-jet recording apparatus useful in the present invention may be of a type in which the recording head is separate from an ink cartridge as in the above embodiment, or of a type in which the recording head is integral with an ink cartridge as seen in FIG. 6.

FIG. 6 shows a recording unit 70 having assembled therein an ink-filled receptor such as for example an ink absorber. The unit 70 is so constructed as to eject an ink in the form of ink droplets from the ink absorber via a head portion 71 having a plurality of orifices. The ink absorber may be formed of polyurethane. An air passage 72 is defined to cause the interior of the unit 70 to communicate with the atmosphere. The recording unit is used as a substitute for the recording head 65 shown in FIG. 4 and hence structured to be detachably engageable with the cartridge 66 of FIG. 4.

Although the ink-jet recording apparatus embodied above is illustrated as ink droplets being ejected by application of thermal energy to an ink, a piezo system using a dielectric device, and the like may be also feasible.

Figure 7:
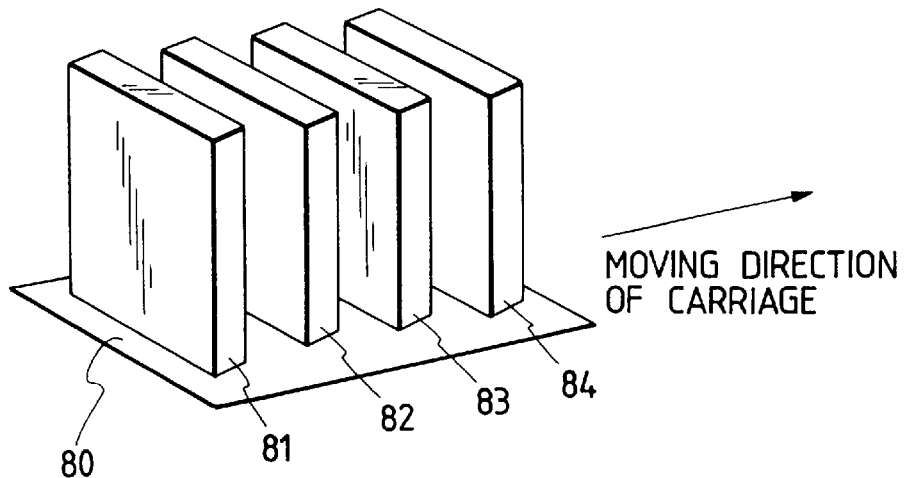
FIG. 7 is a perspective view of a recording portion having a plurality of recording heads disposed therein and embodied in the examples described later.

To practice the recording process of the present invention, four recording heads as shown in FIG. 3 are arranged in parallel with each other on the carriage 80. This arrangement is illustrated in FIG. 7. Reference numerals 81, 82, 83 and 84 are recording heads for ejecting inks of black, cyan, magenta and yellow colors, respectively. The set of recording heads so assembled is mounted on the above exemplified recording apparatus and operated to eject such color inks in response to recording signals.

Figure 8:
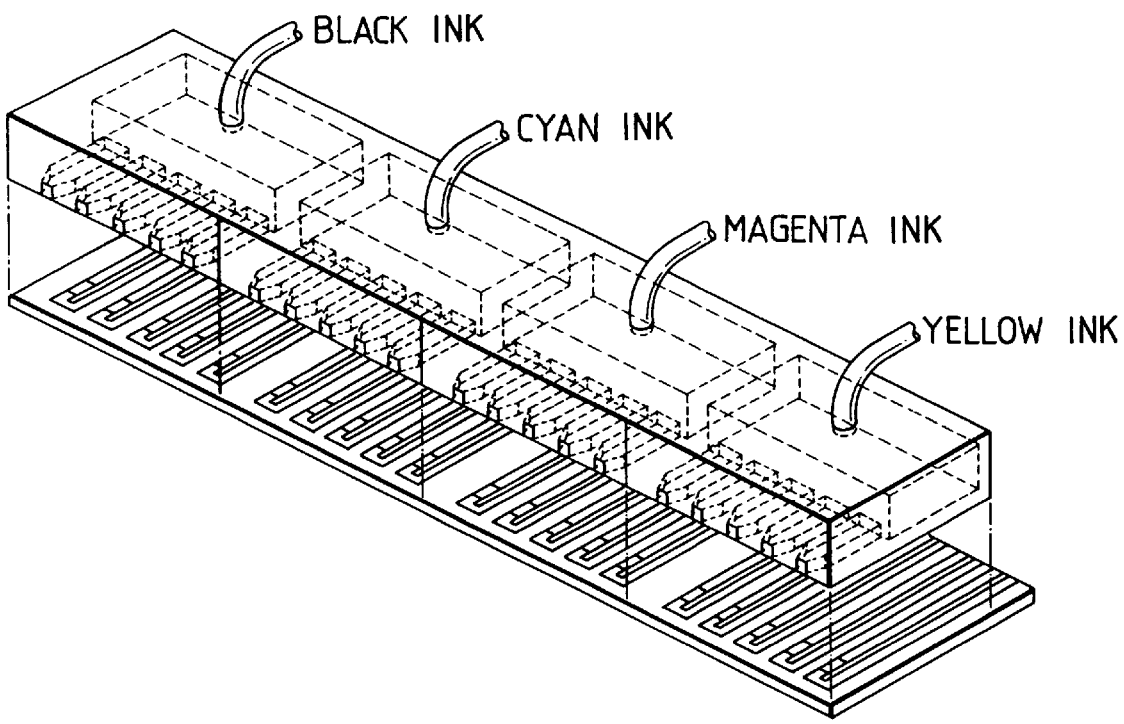
FIG. 8 is a perspective view showing another form of recording head used in the present invention.

The use of four recording heads as shown in FIG. 7 is for illustrative purposes only. Alternatively, a single recording head can be modified to have a plurality of conduits through which flow a plurality of color inks as seen in FIG. 8.

The following examples are given to further illustrate the present invention. In these examples, all parts are by weight unless otherwise noted, and all average molecular weights are abbreviated to "MW" for brevity.

EXAMPLE 1

Preparation of Ink Set 1
(1) Yellow Dispersion
   Components of:

| | |
|---|---|
| styrene-acrylic acid copolymer (MW: 7,000) | 5.5 parts, |
| monoethanolamine | 1.0 part, |
| ion-exchanged water | 67.5 parts, and |
| diethylene glycol | 5.0 parts | were mixed and heated at 70° C. in a water bath to fully dissolve the resin component. To the resulting solution were added 20 parts of C.I. Pigment Yellow 74 and 1.0 part of isopropyl alcohol. Premixing was conducted for 30 minutes, followed by dispersing treatment under conditions indicated below.

mill: Sand Grinder,
   milling media: zirconium beads, 1 mm in diameter,
   filling ratio of milling media: 50% by volume,
   milling time: 3 hours.

Further centrifugation (12,000 rpm, 20 min) was conducted to remove coarse particles, thereby providing the Yellow dispersion.
(2) Magenta Dispersion
   Components of:

| | |
|---|---|
| polyoxyethylene alkylether phosphate salt | 4.0 parts, |
| monoethanol amine | 1.0 part, |
| ion-exchanged water | 69.0 parts, and |
| diethylene glycol | 5.0 parts | were mixed and heated at 70° C. in a water bath to fully dissolve the surfactant. To the resulting solution were added 20 parts of C.I. Pigment Red 122 and 1.0 part of isopropyl alcohol. Premixing was conducted for 30 minutes, followed by dispersing treatment under the same conditions as in the yellow dispersion above, thereby providing the Magenta dispersion.

(3) Cyan Dispersion
   Components of:

| | |
|---|---|
| polyoxyethylene alkyl ether phosphate salt | 5.0 parts, |
| monoethanolamine | 1.0 part, |
| ion-exchanged water | 68.0 parts, and |
| diethylene glycol | 5.0 parts | were mixed and heated at 70° C. in a water bath. To the resulting solution were added 20 parts of C.I. Pigment Blue 15:3 and 1.0 part of isopropyl alcohol. Premixing was conducted for 30 minutes, followed by dispersing treatment under the same conditions as in the yellow dispersion above, thereby providing the Cyan dispersion.

(4) Black Dispersion
   Components of:

| | |
|---|---|
| styrene-acrylic acid copolymer (MW: 7,000) | 5.0 parts, |
| monoethanolamine | 1.0 part, |
| ion-exchanged water | 68.0 parts, and |
| diethylene glycol | 5.0 parts | were mixed and heated at 70° C. in a water bath to fully dissolve the resin component. To the resulting solution were added 20 parts of a carbon black (MCF 88, tradename, produced by Mitsubishi Chemical Co.) and 1.0 part of isopropyl alcohol. Premixing was conducted for 30 minutes, followed by dispersing treatment under the same conditions as in the yellow dispersion above, thereby providing the Black dispersion.

(5) Color Inks
   Different color inks were prepared by mixing components of:

| | |
|---|---|
| each of dispersions (1) to (4) above | 30 parts, |
| glycerol | 10 parts, |
| diethylene glycol | 10 parts, |
| polyethylene glycol #400 | 5 parts, |
| N-methyl-2-pyrrolidone | 10 parts, |
| ethyl alcohol | 5 parts, and |
| ion-exchanged water | 30 parts, | so as to have a desired concentration. Thus, there was provided Ink Set 1 of four colors according to the present invention.

Ink Set 1 was tested for evaluating performances using an ink-jet color recording apparatus having a plurality of recording heads of an on-demand type in which an ink was ejected upon application of thermal energy corresponding to recording signals.

Test Methods
Test 1: Ejection Quantity
After printing with a given ejection pulse, an amount of an ink spent was measured from which the quantity of the ink per a single ink droplet ejected out of an orifice was calculated. This measurement was conducted for each of the four inks of the test ink set to thereby obtain an average value. The Ejection Quantity was evaluated by judging a deviation of measured value of each ink from the average value, and ranked in accordance with following standard.

1) "A" where the deviations of all inks are within a range of smaller than ±10%;
2) "B" where the deviation of at least one ink is in a range of from ±11% to ±15%; and
3) "C" where the deviation of at least one ink is within a range of larger than ±16%.

Test 2: Ejection Speed
An average speed of an ink droplet was measured when the ink flies a distance of 0.5 mm from an orifice. The Ejection Speed was evaluated by judging a deviation of measured value of each ink from the average value, and ranked in accordance with following standard.

1) "A" where the deviations of all inks are within a range of smaller than ±15%;
2) "B" where the deviation of at least one ink is in a range of from ±16% to ±25%; and
3) "C" where the deviation of at least one ink is within a range of larger than ±26%.

Test 3: Frequency Response
Image distortion, namely ejection failure, defective ink-droplet impact and not uniform dot diameter, was checked when a drive frequency was elevated gradually slightly from 1 kHz. The highest frequency capable of a stable ejection for each ink was measured, and an average value was calculated within four inks in the Ink Set. The Frequency Response was evaluated by judging a deviation of measured value of each ink from the average value, and ranked in accordance with following standard.

1) "A" where the deviation is within a range of smaller than −10%; and
2) "C" where the deviation is in a range of larger than −11%.

Test 4: Storage Stability
Each color ink was placed in a glass vessel in sealed conditions and stored at 60° C. for 3 months. A case in which an agglomeration of pigment or viscosity buildup of an ink had taken place was adjudged by "C", while a case without such physical deterioration was by "A".

The Ink Set of Example 1 is evaluated as "A" in all tests.

EXAMPLES 2 TO 5

The procedure for Ink Set 1 in Example 1 was followed except that pigments and dispersants were varied only in their kinds as shown in Tables 1 and 2, after which Ink Sets 2 to 5 were obtained. The Ink Sets 2 to 5 were tested as in Example 1 with the results shown in Table 4.

Comparative Examples 1 and 2

Ink Sets 6 and 7 shown in Table 3 were tested as in Example 1. The results are tabulated in Table 4.

TABLE 1

| | Ink Set 2 | | | | Ink Set 3 | | | |
|---|---|---|---|---|---|---|---|---|
| | Y | M | C | K | Y | M | C | K |
| Pigment | | | | | | | | |
| Carbon black (MOGUL L/Cabot Co.) | | | | 20 | | | | |
| Carbon black (MCF88/Mitsubishi Chemical Co.) | | | | | | | | 20 |
| C.I. Pigment Yellow 74 | | | | | 20 | | | |
| C.I. Pigment Yellow 109 | 20 | | | | | | | |

TABLE 1-continued

|  | Ink Set 2 | | | | Ink Set 3 | | | |
| --- | --- | --- | --- | --- | --- | --- | --- | --- |
|  | Y | M | C | K | Y | M | C | K |
| C.I. Pigment Red 122 |  |  |  |  |  |  |  |  |
| C.I. Pigment Red 112 |  | 20 |  |  |  | 20 |  |  |
| C.I. Pigment Blue 15:3 |  |  |  |  |  |  | 20 |  |
| C.I. Pigment Blue 22 |  |  | 20 |  |  |  |  |  |
| Dispersant |  |  |  |  |  |  |  |  |
| Styrene-acrylic acid copolymer (MW: 7,000) |  | 4.0 |  | 5.0 | 5.0 |  |  |  |
| Styrene-maleic acid-maleic acid half ester copolymer (MW: 12,000) |  |  |  |  |  |  |  | 5.0 |
| Styrene-acrylic acid-butyl acrylate copolymer (MW: 3,700) | 5.5 |  |  |  |  |  |  |  |
| Polyoxyethylene alkylether phosphate salt |  |  | 5.0 |  |  | 4.0 |  |  |
| Polyoxyethlene fatty acid amide |  |  |  |  |  |  |  |  |
| Polyoxyethlene alkylamine |  |  |  |  |  |  | 5.5 |  |

TABLE 2

|  | Ink Set 4 | | | | Ink Set 5 | | | |
| --- | --- | --- | --- | --- | --- | --- | --- | --- |
|  | Y | M | C | K | Y | M | C | K |
| Pigment |  |  |  |  |  |  |  |  |
| Carbon black (MOGUL L/Cabot Co.) |  |  |  |  |  |  |  |  |
| Carbon black (MCF88/Mitsubishi Chemical Co.) |  |  |  | 20 |  |  |  | 20 |
| C.I. Pigment Yellow 74 | 20 |  |  |  |  |  |  |  |
| C.I. Pigment Yellow 109 |  |  |  |  | 20 |  |  |  |
| C.I. Pigment Red 122 |  | 20 |  |  |  | 20 |  |  |
| C.I. Pigment Red 112 |  |  |  |  |  |  |  |  |
| C.I. Pigment Blue 15:3 |  |  |  |  |  |  | 20 |  |
| C.I. Pigment Blue 22 |  |  | 20 |  |  |  |  |  |
| Dispersant |  |  |  |  |  |  |  |  |
| Styrene-acrylic acid copolymer (MW: 7,000) | 5.5 |  |  | 5.0 |  |  |  |  |
| Styrene-maleic acid-maleic acid half ester copolymer (MW: 12,000) |  |  |  |  |  |  |  |  |
| Styrene-acrylic acid-butyl acrylate copolymer (MW: 3,700) |  |  |  |  |  |  |  | 5.0 |
| Polyoxyethylene alkylether phosphate salt |  | 4.0 |  |  |  |  | 5.0 |  |
| Polyoxyethlene fatty acid amide |  |  |  |  |  | 4.0 |  |  |
| Polyoxyethlene alkylamine |  |  | 5.0 |  | 5.5 |  |  |  |

TABLE 3

|  | Ink Set 6 | | | | Ink Set 7 | | | |
| --- | --- | --- | --- | --- | --- | --- | --- | --- |
|  | Y | M | C | K | Y | M | C | K |
| Pigment |  |  |  |  |  |  |  |  |
| Carbon black (MOGUL L/Cabot Co.) |  |  |  |  |  |  |  |  |
| Carbon black (MCF88/Mitsubishi Chemical Co.) |  |  |  | 20 |  |  |  | 20 |
| C.I. Pigment Yellow 74 | 20 |  |  |  | 20 |  |  |  |
| C.I. Pigment Yellow 109 |  |  |  |  |  |  |  |  |
| C.I. Pigment Red 122 |  | 20 |  |  |  | 20 |  |  |
| C.I. Pigment Red 112 |  |  |  |  |  |  |  |  |
| C.I. Pigment Blue 15:3 |  |  | 20 |  |  |  | 20 |  |
| C.I. Pigment Blue 22 |  |  |  |  |  |  |  |  |
| Dispersant |  |  |  |  |  |  |  |  |
| Styrene-acrylic acid copolymer (MW: 7,000) |  |  |  |  |  |  |  |  |
| Styrene-maleic acid-maleic acid half ester copolymer (MW: 12,000) |  |  |  |  |  |  |  |  |
| Styrene-acrylic acid-butyl acrylate copolymer (MW: 3,700) | 5.5 | 4.0 | 5.0 | 5.0 |  |  |  |  |
| Polyoxyethylene alkylether phosphate salt |  |  |  |  |  |  |  |  |
| Polyoxyethlene fatty acid amide |  |  |  |  |  |  |  |  |
| Polyoxyethlene alkylamine |  |  |  |  | 5.5 | 4.0 | 5.0 | 5.0 |

TABLE 4

|  | Ink Set | Test 1 | Test 2 | Test 3 | Test 4 |
| --- | --- | --- | --- | --- | --- |
| Example 2 | 2 | A | A | A | A |
| Example 3 | 3 | A | A | A | A |
| Example 4 | 4 | A | A | A | A |
| Example 5 | 5 | A | A | A | A |
| Comp. Example 1 | 6 | C | B | C | B |
| Comp. Example 2 | 7 | C | B | C | B |

With the provision of the ink-jet color recording process and ink set of the present invention, balanced ejection characteristics such as ejection quantity, ejection speed and frequency response can be achieved as regards pigment-based inks of different colors relative to the associated recording head. Color images of high quality, therefore, are obtainable without reliance upon individual designing of recording heads to meet the respective properties of different color inks. This contributes greatly to enhanced operability of the recording head, producibility and cost saving.

What is claimed is:

1. A process for forming a color image on a recording medium by applying a black ink, a yellow ink, a magenta ink and a cyan ink with an ink-jet printing apparatus, each of the inks comprising a pigment and a dispersant, wherein:

the black ink contains carbon black as the pigment and a water-soluble resin as the dispersant, the cyan ink contains a phthalocyanine pigment as the pigment and a water-soluble surfactant as the dispersant for the phthalocyanine pigment, the magenta ink contains a quinacridon pigment as the pigment and a water-soluble surfactant as the dispersant for the quinacridon pigment, and the yellow ink contains a yellow pigment and a water-soluble surfactant or a water-soluble resin as the dispersant for the yellow pigment.

2. The process according to claim 1, wherein each of the yellow ink, magenta ink and cyan ink is an aqueous pigment-based dispersion ink.

3. The process according to claim 1, wherein the water-soluble surfactant is selected from the group consisting of phosphate ester surfactant, polyoxyethylene fatty acid amides and polyoxyethylenealkyl amines.

4. The process according to claim 1, wherein the yellow ink contains the water-soluble surfactant and the amount of the water-soluble surfactant in each of the yellow ink, magenta ink and cyan ink ranges from 0.1 to 10% by weight based on the total weight of the respective inks.

5. The process according to claim 4, wherein the amount of the water-soluble surfactant in each of the yellow ink, magenta ink and cyan ink ranges from 1 to 5% by weight based on the total weight of the respective inks.

6. The process according to claim 1, wherein the water-soluble resin in the black ink has a weight average molecular weight of from 500 to 30,000.

7. The process according to claim 6, wherein the water-soluble resin in the black ink has a weight average molecular weight of from 1,000 to 15,000.

8. The process according to claim 1, wherein the phthalocyanine pigment is C.I. Pigment Blue 15:3.

9. The process according to claim 1, wherein the quinacridon pigment is C.I. Pigment Red 122, C.I. Pigment Red 202 or C.I. Pigment Red 207.

10. The process according to claim 1, wherein the carbon black has a primary particle size of from 15 to 40 nm, a specific area of from 50 to 300 $m^2/g$ by the BET method, a DBP adsorption of from 40 to 150 ml/100 g, a volatile content of from 0.5 to 10% and a pH of from 2 to 9.

11. An ink set comprising a black ink, a yellow ink, a magenta ink and a cyan ink independently, each of the inks containing a pigment and a dispersant for the pigment, wherein the black ink contains carbon black as the pigment and a water-soluble resin as the dispersant, the cyan ink contains a phthalocyanine pigment as the pigment and a water-soluble surfactant as the dispersant for the phthalocyanine pigment, the magenta ink contains a quinacridon pigment as the pigment and a water-soluble surfactant as the dispersant for the quinacridon pigment, and the yellow ink contains a yellow pigment and a water-soluble surfactant or a water-soluble resin as the dispersant for the yellow pigment.

12. The ink set according to claim 11, wherein each of the yellow ink, magenta ink and cyan ink is an aqueous pigment-based dispersion ink.

13. The ink set according to claim 11, wherein the water-soluble surfactant is selected from the group consisting of phosphate ester surfactant, polyoxyethylene fatty acid amides and polyoxyethylenealkyl amines.

14. The ink set according to claim 11, wherein the yellow ink contains the water-soluble surfactant and the amount of the water-soluble surfactant in each of the yellow ink, magenta ink and cyan ink ranges from 0.1 to 10% by weight based on the total weight of the respective inks.

15. The ink set according to claim 14, wherein the amount of the water-soluble surfactant in each of the yellow ink, magenta ink and cyan ink ranges from 1 to 5% by weight based on the total weight of the respective inks.

16. The ink set according to claim 11, wherein the water-soluble resin in the black ink has a weight average molecular weight of from 500 to 30,000.

17. The ink set according to claim 16, wherein the water-soluble resin in the black ink has a weight average molecular weight of from 1,000 to 15,000.

18. The ink set according to claim 11, wherein the phthalocyanine pigment is C.I. Pigment Blue 15:3.

19. The ink set according to claim 11, wherein the quinacridon pigment is C.I. Pigment Red 122, C.I. Pigment Red 202 or C.I. Pigment Red 207.

20. The ink set according to claim 11, wherein the carbon black has a primary particle size of from 15 to 40 nm, a specific area of from 50 to 300 $m^2/g$ by the BET method, a DBP adsorption of from 40 to 150 ml/100 g, a volatile content of from 0.5 to 10% and a pH of from 2 to 9.

* * * * *

UNITED STATES PATENT AND TRADEMARK OFFICE
CERTIFICATE OF CORRECTION

PATENT NO. : 5,993,527

DATED : November 30, 1999

INVENTOR(S) : TOCHIHARA ET AL.

It is certified that error appears in the above-identified patent and that said Letters Patent is hereby corrected as shown below:

Title page, item
[56] References Cited:
 FOREIGN PATENT DOCUMENTS, "4170474" should read --4-170474--, "5155006" should read --5-155006--, and "6001936" should read --6-001936--.

Signed and Sealed this

Sixth Day of February, 2001

Attest:

Q. TODD DICKINSON

Attesting Officer

Director of Patents and Trademarks